United States Patent [19]

Riggins

[11] Patent Number: 4,848,702
[45] Date of Patent: Jul. 18, 1989

[54] AERO MARINE VEHICLE

[76] Inventor: James W. Riggins, 3304 40th St., San Diego, Calif. 92105

[21] Appl. No.: 45,392

[22] Filed: May 4, 1987

[51] Int. Cl.$^4$ .............................................. B64D 25/54
[52] U.S. Cl. .................................... 244/105; 114/283; 114/289
[58] Field of Search ............... 244/105, 106, 107, 130; 114/67 A, 271, 283, 284, 288, 289, 292

[56] References Cited

U.S. PATENT DOCUMENTS

| | | | |
|---|---|---|---|
| 2,007,598 | 7/1935 | Easthop | 114/67 A |
| 2,062,384 | 12/1936 | White et al. | 244/105 |
| 2,073,864 | 3/1937 | Brush | 244/105 |
| 2,364,845 | 12/1944 | Glen | 244/105 |
| 2,445,446 | 7/1948 | Mas | 244/55 |
| 4,351,500 | 9/1982 | Golze | 244/105 |

FOREIGN PATENT DOCUMENTS 320660  8/1934  Italy .

OTHER PUBLICATIONS

Aviation Week and Space Tech, Oct. 24, 1983, Cover, pp. 66–67.

Primary Examiner—Galen Barefoot
Attorney, Agent, or Firm—Charles C. Logan, II

[57] ABSTRACT

An aero marine vehicle having a fuselage having front wings extending from its respective left and right sides. Engines are mounted in these wings and their drive propellers are supported adjacent the rear edge of these wings. A pair of laterally spaced hull members are supported beneath the respective right and left wings. A plenum chamber is formed in each of the hull members with the bottom wall of the hull members forming the bottom wall of the plenum chambers. Exhaust lines are connected between the engines and the respective plenum chambers. The bottom wall of the hull members has a plurality of exhaust ports formed therein which allow the escaping exhaust gases to form a boundary layer of air between the bottom wall of the hull members and the water they are floating upon to overcome the suck-down effect of the water upon the hull member. The majority portion of the interior of the hull members form a buoyancy chamber. The rear struts extending downwardly from the front wings of the vehicle have their bottom ends pivotally attached to a bracket mounted atop the respective hulls. The front strut members extending downwardly from the wings have their bottom end pivotally attached to top end of a rod extending from a hydraulic cylinder mounted within the hull members. This structure allows the front end of the hull members to be pivoted upwardly and downwardly a predetermined number of degrees with respect to the horizontal axis of the hull members.

8 Claims, 4 Drawing Sheets

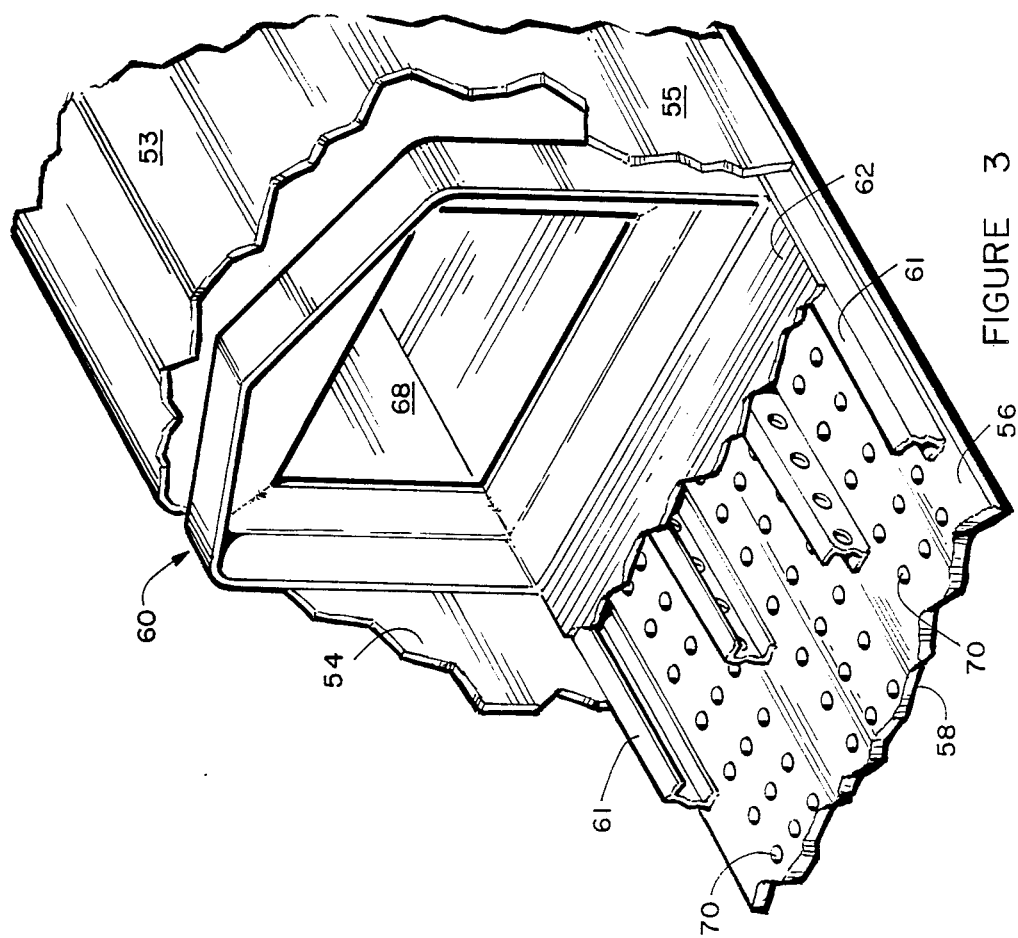
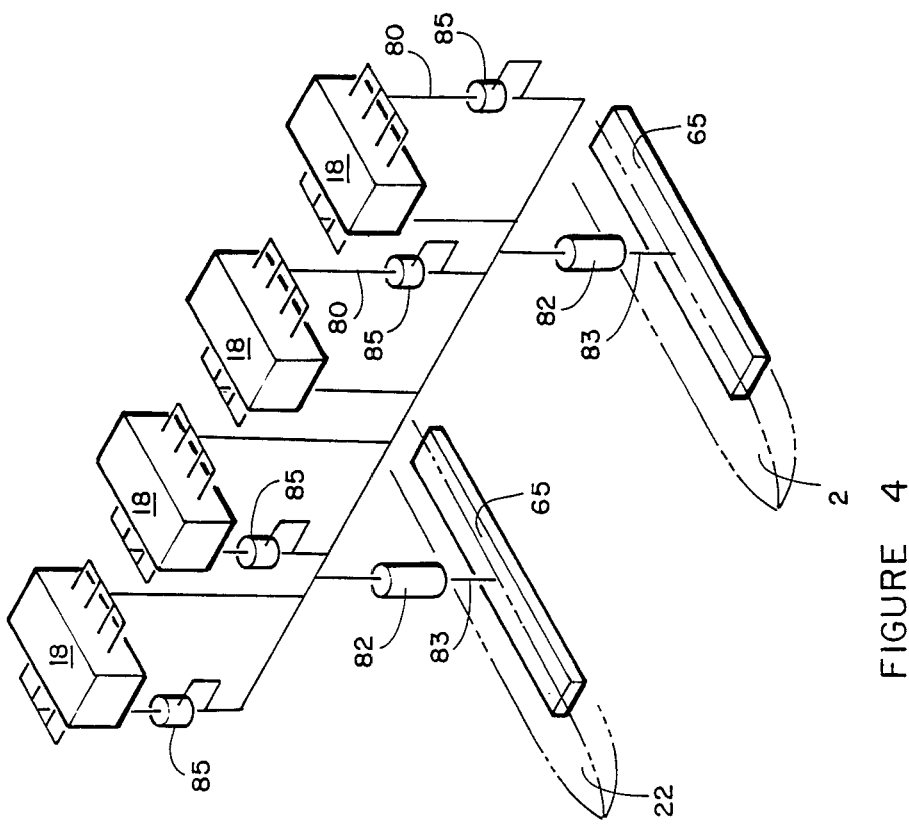

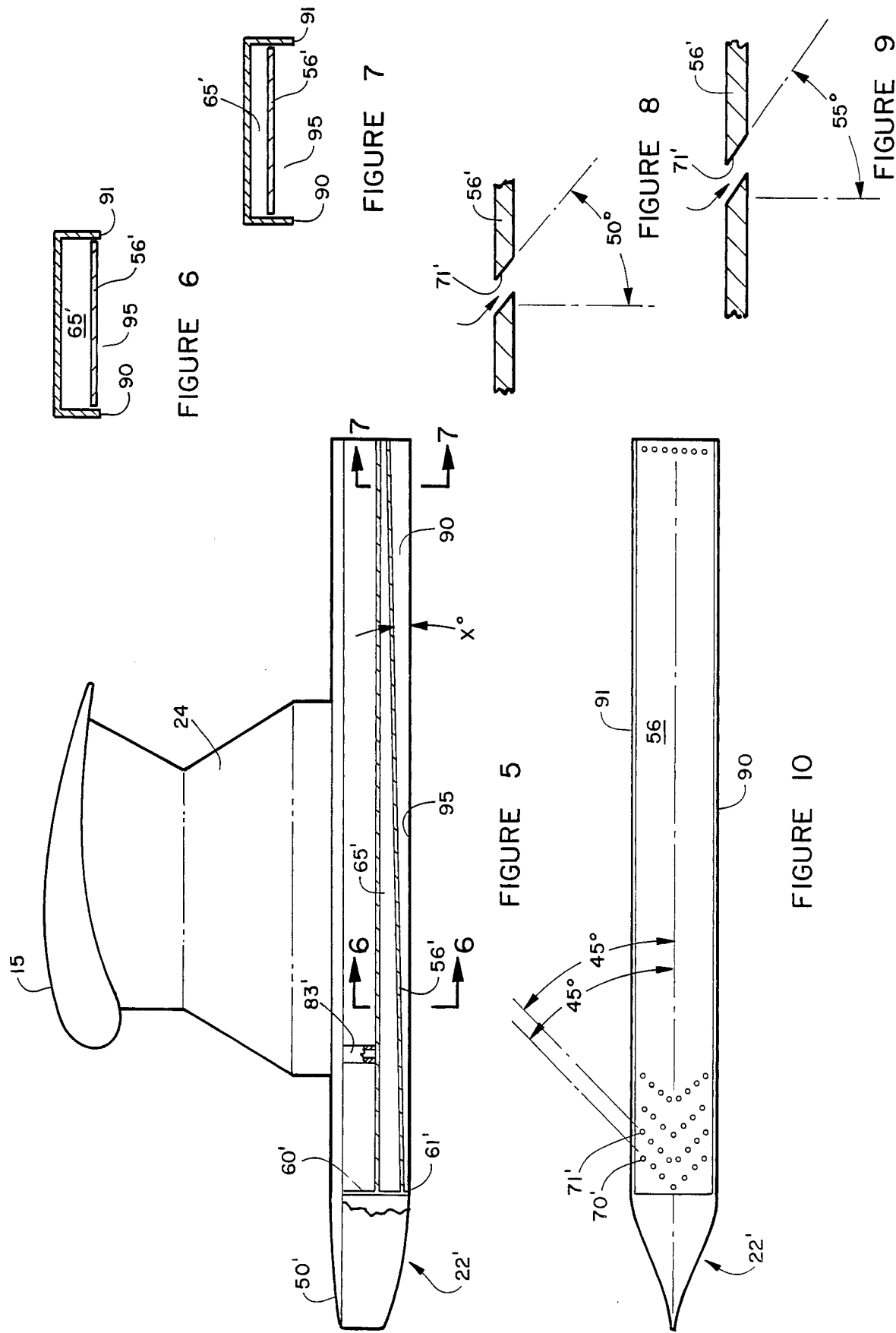

AERO MARINE VEHICLE

BACKGROUND AND SUMMARY OF THE INVENTION

The invention relates to a vehicle and more specifically to an aero marine vehicle designed to either travel upon the water or in the air.

In the past airplanes have had pontoons attached to them so that the airplane could land or takeoff from the water. U.S. Pat. No. 1,693,773 of Anderson discloses a pontoon for an airplane that has a stepped rear portion. U.S. Pat. No. 1,817,047 to Wallraff discloses an airplane pontoon having longitudinal air ducts on the bottom surface of the pontoon members and these air ducts have small holes through which exhaust passes from the airplane's engine may be forced to form a boundary layer of air between the pontoon and the surface of the water. The White et al U.S. Pat. No. 2,062,384 also shows for a seaplane that utilize exhaust gases from the aircraft's engine. The structures of these patents have not been entirely satisfactory as witnessed by the fact that none of these structures are presently being manufactured and being used.

The aero marine vehicle is a culmination of innovations and new technology that has come together through many years of study in the fields of hydrodynamics, aerodynamics, and mechanical engineering. Applicant's combination of simplicity and practicality are what make it so unique.

In the design work, certain rules have been followed because of the particular approach to the subject. That is, if one is designing a boat, it follows certain rules in hydrodynamics. If the design is for an aircraft, aerodynamics is followed. In the world of design, the designer is not allowed to cross over or so it seems. If he does, it leads to very expensive, complicated systems, (i.e. hydro-foils, hovercraft, etc). From these systems come a great deal of technology, but this technology has failed to do one thing, it has failed to fill the void of speed that exists on the water between 40 and 80 miles an hour.

In this category, the first units that come to mind are the cigarette boat or ocean-going racers. These units are still subjected to gravity, however. We then come back to the saveer pounding that takes place. In order for these hulls to take this type of punishment, they must be designed and built very strongly. Thus, additional weight is required. The more weight, the more power, the more fuel usage, thus a vicious cycle exists.

To maintain the higher speeds, these units have to use a large percentage of their installed horsepower, resulting in high fuel consumption, approximately one gallon of fuel per minute, resulting in a range of two hundred miles. This is really not very practical.

It is difficult to find an overall comparison for this speed range (40 to 80 mils per hour) as very few exist. One must assume that after 80 miles per hour, aircraft take over.

The most significant breakthrough in hydrodynamics in many years is the unqiue design of the aero marine vehicle's hulls. To eliminate suck-down or a large portion of the drag, applicant's hulls have been equiped with a turbocharged plenum chamber. This has been achieved by utilizing the wasted energy of the engine, the exhaust. The exhaust from one side of a V-8 engine powers a 20 psi turbocharger. The high pressure air of the turbocharger is fed by way of a by pass tube to the exhausting gases of the exhaust. This in turn eliminates the exhaust backpressure of the engines created by the turbocharger. This in turn pressurizes the plenum chamber, which is equiped with several exhaust ports. This creates a very significant boundary layer of air around the hull, thus eliminating a great deal of the hydrodynamic drag.

As the fresh air from the turbo re-enters the exhaust path, the combination of cool and hot gases are further cooled by means of an exhaust eradicator. The cooler exhaust gases being more dense then create a more solid boundary layer of air around the hulls. Since all of the exhaust gases are fed to the plenum chamber, the chamber now becomes a silenser or large muffler. Thus the annoying exhaust noise is all but eliminated.

In selection of the hull design applicant again returned to the basics. In water tunnel tests, it has been proven that the flat plane or the ski is the lowest drag profile of all of the planing devices. Thus applicant has used a flat plane for the bottom surface of his hulls. A V-hull is mostly designed for high impact loads or for comfort. The end result is more drag because of the amount of wetted surface.

Preferably applicant would have his hull constructed of aluminum with a high impact polymer surface.

The final phase of hull selection is to try to achieve a high aspect ratio. Under normal circumstances, the first thing that surfaces when aspect ratio is pursued is stability. By placing the hulls on struts under the wings at a predetermined span, a great deal of stability is provided.

An example of some of the relationships developed for an aero marine vehicle using applicant's novel design, for a vehicle having a gross weight of 10,000 pounds would be as follows. The hulls would be approximately 38 feet long by 3 feet wide by 12 inches deep. Static (or at anchor) the vehicle, would displace only approximately 8 inches of water.

The aero marine vehicle has two modes, one being water-borne and one being airborne.

With applicant's novel aero marine vehicle, additional liberties over conventional marine craft is possible. For instance, conventional marine craft have under the waterline, shafts, logs, screws, rudders, and through-hull fittings just to name a few. Applicant's aero marine vehicle has one of these. In shallow water, conventional marine vehicles are subject to such things as sand picked by the screw. This in turn is picked by the water pump intake. The end result is damage to the water pump impeller. Any contact with the bottom by the screw normally results in some kind of damage, whether it be to the screw shaft, log, etc.

A propeller in the water works like a vacuum cleaner. It pulls in floating anchor lines, fishing lines, ropes, gill nets, and anything else that is close by. Because high pressure air is discharged through the hulls of applicant's aero marine vehicle, this air actually pushes objects away. It is possible to go over sand bars, weeds, gill nets, and even kelp beds, without damaging the objects or the hulls.

In different parts of the world, there is shallow water, whether it be the shallow bottom of a river, shallow reefs along the coast, or even the kelp beds along the coastline. These areas are closed to any kind of navigation as it now exists. Applicant's novel aero marine vehicle can now open up these areas safely, whether it be by patrol craft, passenger or even cargo aero marine vehicles.

The use of long narrow hulls on the aero marine vehicle give it a long reaching effect in light to moderate seas. The hulls are designed with "wave splitters". Wave splitters reduce the wave impact on the leading edge of the hulls. At lower speeds, they knife their way through the waves at the front of the attach point where the strut attaches to the hull.

A high speed planning hull, regardless of its design, weight or construction, is subjected to sever pounding in moderate or rough seas.

In designing the hulls, a great attention has been directed to impact loads that they would receive. Short or high density loads usally occur at lower velocities. These are usually present when encounters some type of surface disturbances, whether it be wind, or other boats, etc. This pounding effect usually occurs between the speed ranges of 20 to 40 mph, depending upon the size of the boat.

By having two hulls, there is a distribution of the load. Applicant's hulls have been spaced at such a distance that one hull does not know what the other hull is doing. In taking this approach, the hulls have to be spaced so as not to cause water impingement. That is, one hull creating a wake strong enough to impinge on the other.

A second approach that was taken in the design of applicant's novel vehicle was to put a hydraulic cylinder at the forward attach point of the hull to his struts. From the upper and lower sections of the cylinder, the piston being centered, there have been two hydraulic accumulators connected. When the shock loads are transmitted from the water to the hull, the hull in turn transmitts it to the ram and the ram transmitts it to the accumulators. Thus, the shock loads are greatly reduced. By reducing the shock loads at the entry point, it does two things. One, it provides a smoother ride, and two it will not allow these destructive loads to be transmitted to the main structure, thus reducing metal fatigue.

The hydraulic cylinder also performs another function. Since the hulls that have no steps, to allow for a rotation, by using the hydraulic cylinder the angle of attack can be controlled up to 10 degrees for liftoff or down a negative angle of attack for stopping. This functions as a trim device.

As the aero marine vehicle approaches high forward velocities, there are two things that occur simultaneously, ground effect and wing lift. The struts play a very important role in ground effect. The upper attach point is attached to the front and rear spars of the wing structure. The angle of the struts from the upper wing to the hulls is approximately 25 degrees. The overall distance of the wing to the water surface would be approximately 8 feet. The struts are a true air foil configuration. They are oriented outboard 3 degrees, or given a positive angle of attack. The three degree angle of the struts does not give additional lift as a wing because of the angle but it does perform two basic functions. First the struts form a tunnel, for a ram air effect. Secondly by using the true air foil configuration, it gives the vehicle a low drag profile. In the upper portion of the tunnel or at the underside of the trailing edge of the wing, over a distance of approximately 16 inches, this section is turned downwardly approximately 6 inches to form a downward curve. This downward curve does not apply to the outer wing angle.

In operation as the aero marine vehicle enters the realm of speed between 40 and 80 miles per hour, several things occur. The underside of the hulls are discharging high pressure air for an air cushion, ground effect is pushing from the bottom, the wing is lifting from the top, and a very significant amount of dampening is present from the wing. The forward rams in the hulls are further reducing shock loads. The use of the two hulls splits the distribution of the load and the long length of the hulls aids in stability.

In one of the alternative embodiments of the hull configuration, the exhaust ports formed in the bottom wall of the plenum chamber are directed downwardly and rearwardly at various degrees. If the exhaust port holes are $\frac{1}{8}$ inch in diameter, the exhaust port holes make an angle of 50 degrees with respect to the bottom surface of the plenum chamber. If the exhaust port holes are 1/16 inch in diameter the exhaust port holes make a 55 degree angle with respect to the bottom surface of the plenum chamber. Additionaly, the exhaust port holes have a specific pattern in the manner in which they are arranged along the longitudinal axis of the bottom surface of the plenum chamber. Starting from a point centrally located between the lateral sides of the hull, exhaust ports $\frac{1}{8}$ inch in diameter are aligned on imaginary lines making a 45 degree angle to the lateral sides of the hull. This pattern for the $\frac{1}{8}$ inch exhaust ports is repeated along the length of the hull. Interspaced between the $\frac{1}{8}$ inch exhaust ports are the 1/16 inch exhaust ports and they are also located on imaginary 45 degree angles. However the 1/16 inch exhaust ports are positioned on different longitudinal axes from those of the $\frac{1}{8}$ inch exhaust ports in a staggered fashion. This allows waves created by the $\frac{1}{8}$ inch exhaust ports to interact with the waves created by the 1/16 inch exhaust ports. Also the exhaust gases will be exiting the 1/16 inch exhaust ports at a faster speed and also at a different angle. All of these strucutres interact to provide a superior cushion of air between the bottom surface of the hulls and the top surface of the water. The spacing of these exhaust ports from each other and the number and size of the individual exhaust ports relates to the aero marine vehicle to be supported upon the water. Extending downwardly from the opposite lateral sides of the plenum chamber are rails that form a full displacement chamber therebetween. The crosssection of this full displacement chamber increases in size from fore to aft. For instance the height of the rails at the forward end of the plenum chamber might be 3 inches and the same rail at the rearward end of the plenum chamber might be 12 inches. This difference in rail height from front to rear is important since it provides a necessary angle of incidence that produces a positive angle of attack for the wings of the aero marine vehicle. This gives the plane a positive displacement on the waters surface.

The total diameter of all of the exhaust port holes in the bottom surface of the plenum chamber is set to relieve substantially all back pressure on the engine. Thus this total would vary with different sized engines. The total diameter of the exhaust apertures in the bottom of the plenum chamber is 2.5 inches per 100 cubic inches of engine displacement. For example, a 450 cubic inch engine would require at least a total of 11.25 inches of diameter for all of the exhaust ports. Therefore 60 exhaust ports of 0.062 inches in diameter give a total of diameter of 3.72 inches and 60 exhaust ports of 0.125 diameter give a total of diameters of 7.5 inches and when added together equal 11.22 inches of diameter which is substantially the amount required for the 450 cubic inch engine discussed above.

The length and width of the hulls is governed by hull pressure resulting from the gross weight of the vehicle. The acceptable hull pressure would be between the range of 3 ounces per square inch to 3 lbs. per square inch.

The angle that the bottom surface of the plenum chamber makes with respect to horizontal in between 1 degree 30 minutes and 4 degrees.

DESCRIPTION OF THE DRAWINGS

FIG. 3 is a partial perspective view illustrating the interior configuration of the hull members;

FIG. 4 is a schematic illustration showing how the exhaust from the engines is transmitted to the plenum chambers in the hull members;

FIG. 5 is a side elevation view of an alternative hull configuration having portions broken away for clarity;

FIG. 6 is a cross sectional view taken along lines 6—6 of FIG. 5;

FIG. 7 is a cross sectional view taken along lines 7—7 of FIG. 5;

FIG. 8 is a partial cross section view illustrating ⅛ inch diameter exhaust port apertures in the bottom of the plenum chamber illustrated in FIG. 5;

FIG. 9 is a partial cross section view illustrating 1/16 inch diameter exhaust port apertures in the bottom of the plenum chamber illustrated in FIG. 5; and FIG. 10 is a partial bottom plan view of the bottom surface of the hull illustrated in FIG. 5.

DESCRIPTION OF THE PREFERRED EMBODIMENT

Figure 1:
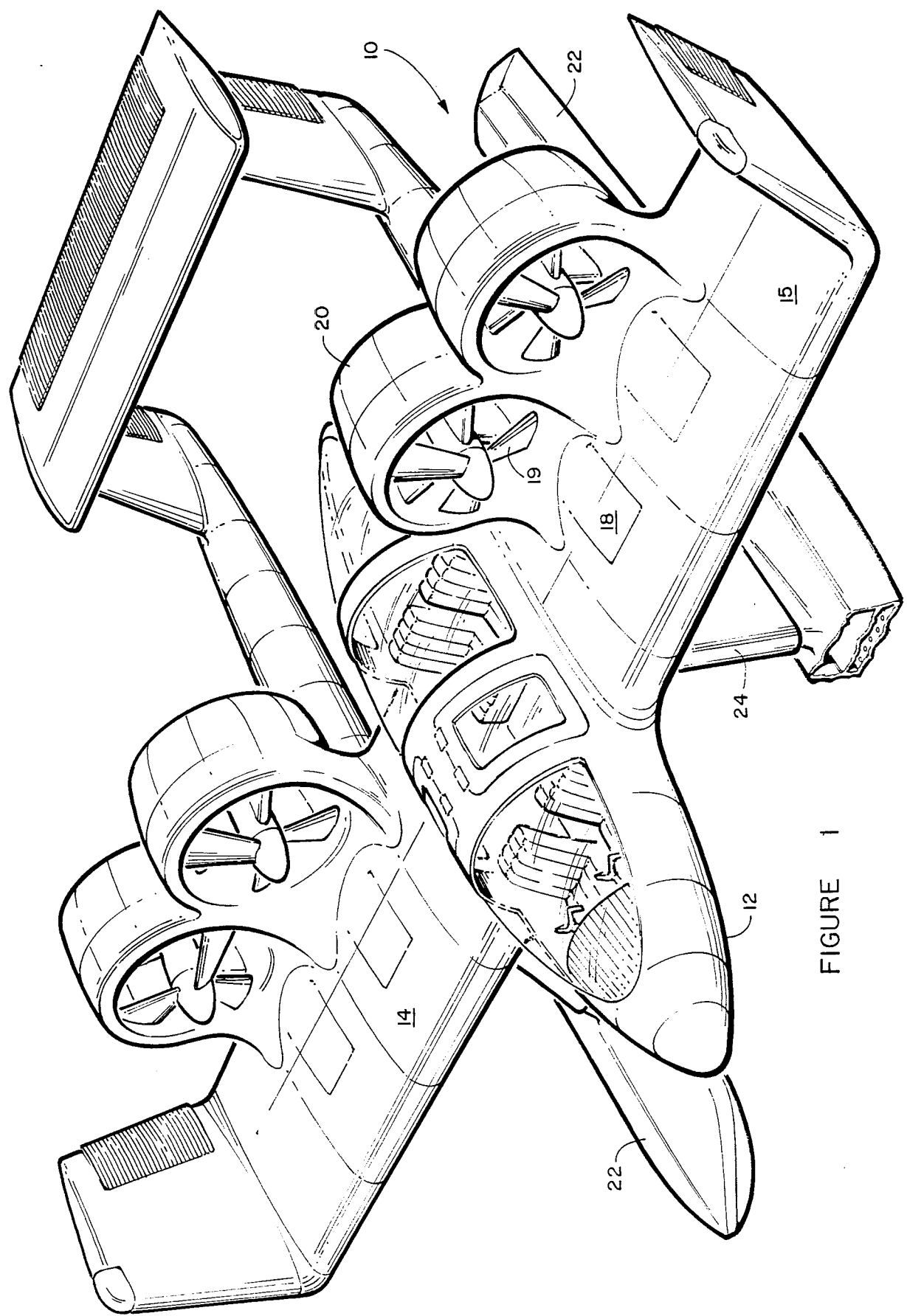
FIG. 1 is a perspective view of applicant's novel aero marine vehicle.

Applicant's novel aero marine vehicle will now be described by referring to FIGS. 1-10 of the drawings. The aero marine vehicle is generally designated numeral 10.

Aero marine vehicle 10 has a fuselage 12 having a right and left wing 14 and 15 extending laterally therefrom. A plurality of engines 18 are mounted in the respective wings. Propellers 19 are mounted in nacelles 20 attached to the rear edge of the wings and these propellers are dirven in a conventional manner. A pair of laterally spaced hulls 22 are attached to the bottom of the wings by strut housings 24.

Figure 2:
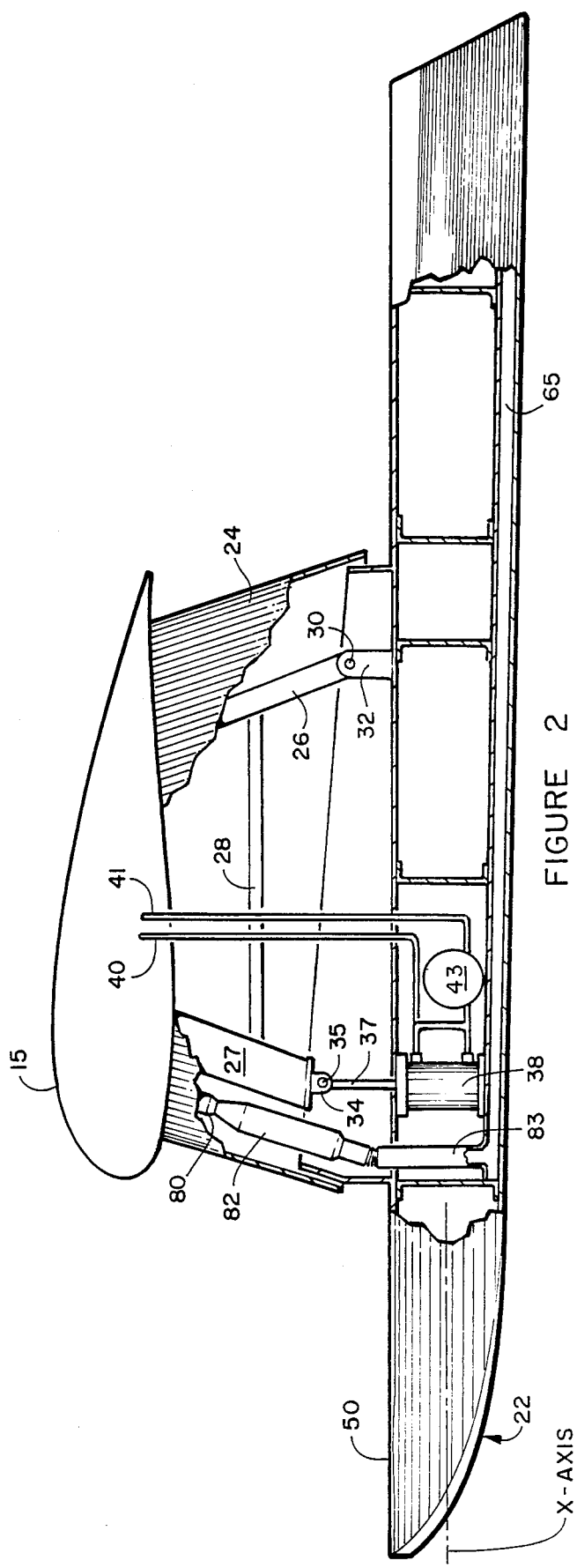
FIG. 2 is a side elevation view with portions broken away to illustrate the manner in which the hull is attached to the wing.
Figure 2B:
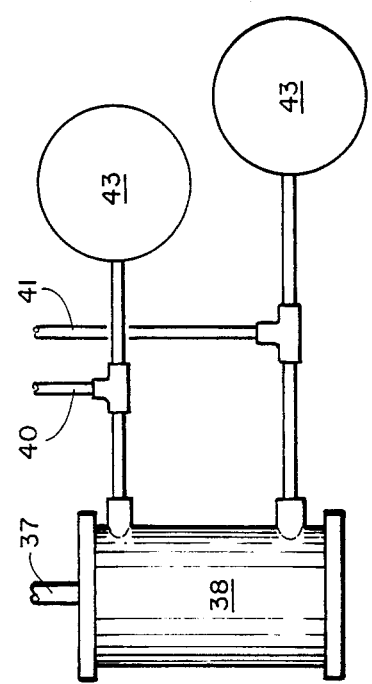
FIG. 2b is a schematic view showing the hydraulic cylinder connected to the accumulator.

The manner in which the hulls are supported is best illustrated in FIG. 2. Within strut housing 24 is found a rear strut 26, a front strut member 27, and a brace 28. A pin 30 passes through an aperture in the lower end of the strut 26 and is also engaged in an aperture formed adjacent the top of bracket 32 which is attached to the top surface of hull 22. The lower end of front strut member 27 has a bracket 34 mounted thereon and it has an aperture through which passes a pin 35 which in turn is received in an aperture in the top end of piston rod 37. The up and down travel of piston rod 37 is controlled by hydraulic cylinder 38. Hydraulic fluid lines 40 and 41 are connected to a hydraulic pump (not shown). An accumulator 43 is also connected to hydraulic line 41. The inclination of the front end of hull 22 can be raised upwardly or downwardly with respect to its horizontal x-axis by controlling the flow of hydraulic fluid downwardly through either hydraulic line 40 or 41.

The hull members 22 have a front end portion 50 and a main body portion 52. The hull members 22 have a top wall 53, lateral side walls 54 and 55, and a bottom wall 56. A surface coating 58 of impact resistance polymer is on the bottom surface of bottom wall 56. A plurality of frame members 60 are spaced longitudinally along the length of the interior of the different hull members 22 to provide additional strength to the hull members. A plurality of longitudinally extending beam members 61 are attached to the top surface of bottom wall 56 and the top surface of the beam members are covered by a top wall member 62. The space between top wall member 62 and bottom wall 56 forms a plenum chamber 65. A buoyancy chamber 68 is formed between the interior walls of the hull 22 and top wall 62. A plurality of exhaust ports are formed in bottom wall 56.

The manner in which the exhaust gases are transmitted to the plenum chamber 65 is best illustrated in FIGS. 2 and 4. Exhaust from engines 18 travel through exhaust lines 80 down through exhaust heat eradicators 82 to the inlet pipe 83 formed at the top of plenum chamber 65. Turbo chargers 85 are located intermediate the length of exhaust lines 80.

An alternative version of a hull member is illustrated in FIGS. 5-10. The hull member is generally designated numeral 22'. Hull member 22' is basically the same as that illustrated in FIG. 2 except for the fact that a pair of laterally spaced rails 90 and 91 extend downwardly from the lateral sides of the bottom wall 56' of the plenum chamber 65'. As a result of this structural change, frame member 60' has to be extended downwardly to give additional depth to hull member 22'. A step 61' is formed at its rear surface. As can be noted in FIGS. 6 and 7 the height of the rails 90 and 91 is greater at their rearward end than that of their forward end. For example the height at the forward end might be 3 inches while the height at the rear end would be 12 inches. These rails plus the bottom of frame member 60 prime and the bottom wall 56 of the plenum chamber form a full displacement chamber 95. The exhaust ports are illustrated in FIGS. 8 and 9 to show the manner that they exit rearwardly at a predetermined angle from the bottom surface of bottom wall 56' of the plenum chamber. Where ⅛ inch diameter exhaust ports 70' are utilized, they exit the bottom surface of the plenum chamber at a 50 degree angle. Where 1/16 inch diameter exhaust ports 71' are utilized, they exit the bottom of the plenum chamber at a 55 degree angle. The arrangement of the exhaust ports 70' and 71' along the longitudinal length of bottom wall 56' is illustrated in FIG. 10. There it is noted that they follow a definite pattern in which the exhaust ports align on imaginary lines that make a 45 degree angle with the center most exhaust port. The rails 90 and 91 not only function to form the full displacement chamber but also act to direct debris away from the bottom surface of the plenum chamber during takeoff and landing.

What is claimed is:

1. An aero marine vehicle comprising:
   a fuselage having a logitudinally extending axis;
   a left front wing and a right front wing extending laterally from the respective sides of said fuselage;
   at least one engine mounted on said aero marine vehicle;
   a pair of laterally spaced elongated hull members;

means supporting one of said hull members below said left wing and one of said hull members beneath said right wing;

said hull members each having a wave splitter front end portion and a main body portion, said main body portion having a rigid top wall, laterally spaced rigid side walls, and a rigid planar bottom wall, spaced outwardly from said planer bottom wall is an intermediate wall that functions both as a top wall of the plenum chamber formed below it and also as the bottom wall of the buoyancy chamber formed above it, said buoyancy chamber comprising the majority of the volume of said hull members due to the need for buoyancy necessitated by the gross weight of the vehicle, extending downwardly from the opposite lateral sides of each of said plenum chambers are rails that form a full displacement chamber therebetween, the cross section of said full displacement chamber increases in size from fore to aft;

means for transmitting the exhaust of the engines to said plenum chambers; and means for providing a boundary layer of air between the bottom wall of said hull members and the water they are floating upon to overcome the suckdown effect of the water upon the hull member comprising a plurality of exhaust ports formed in the bottom wall member of said hull members, said exhaust ports being in communication with the interior of said plenum chamber.

2. An aero marine vehicle as recited in claim 1 wherein the width of the front end portion of the hull members is tapered to reduce water resistance when traveling through the water.

3. An aero marine vehicle as recited in claim 2 wherein the height of the front end of the hull members are tapered to produce lift to the hull as it travels through the water.

4. An aero marine vehicle as recited in claim 1 wherein the rear wall of said hull members slope downwardly and rearwardly.

5. An aero marine vehicle as recited in claim 1 wherein said means for transmitting the exhaust of said engines to said plenum chamber comprise turbo charger means.

6. An aero marine vehicle as recited in claim 1 further comprising means for cooling the exhaust gases prior to their entry into said plenum chamber.

7. An aero marine vehicle as reicted in claim 1 wherein said exhaust ports have a predetermined diameter and they also exit from the bottom surface of said plenum chamber at a predetermined angle.

8. An aero marine vehicle as recited in claim 1 wherein said exhaust ports are positioned at predetermined locations along the longitudinal length of the bottom surface of said plenum chamber according to a set pattern.

* * * * *